Oct. 14, 1924.

H. NYQUIST 1,511,629

ELECTRICAL TESTING SYSTEM

Filed July 16, 1921

INVENTOR
H. Nyquist
BY
ATTORNEY

Patented Oct. 14, 1924.

1,511,629

UNITED STATES PATENT OFFICE.

HARRY NYQUIST, OF ELMHURST, NEW YORK, ASSIGNOR TO AMERICAN TELEPHONE AND TELEGRAPH COMPANY, A CORPORATION OF NEW YORK.

ELECTRICAL TESTING SYSTEM.

Application filed July 16, 1921. Serial No. 485,310.

*To all whom it may concern:*

Be it known that I, HARRY NYQUIST, residing at Elmhurst, in the county of Queens and State of New York, have invented certain Improvements in Electrical Testing Systems, of which the following is a specification.

This invention relates to electrical testing systems and particularly to an arrangement for determining the magnitude of the unbalance between two networks such as a signaling circuit and a net work designed to balance the said circuit.

In my copending application, Serial No. 485,308, filed July 16, 1921, there is described a method for measuring with great accuracy the degree of the unbalance existing between two networks such as a line circuit and an artificial line whose function is to balance the line circuit. Although the arrangement described in the said application gives the most accurate results of all known methods for determining duplex unbalance, a relatively long time must elapse before a state of balance is reached, and consequently its application is probably limited to measurements requiring great precision.

It is the object of this invention to provide an arrangement for determining the magnitude of duplex unbalance which is adapted to give a quantitative measurement much more rapidly than can be obtained by the method described in my copending application above referred to, thereby making this invention particularly applicable for measurements which require moderately great precision and which have to be made fairly rapidly.

Figure 1:
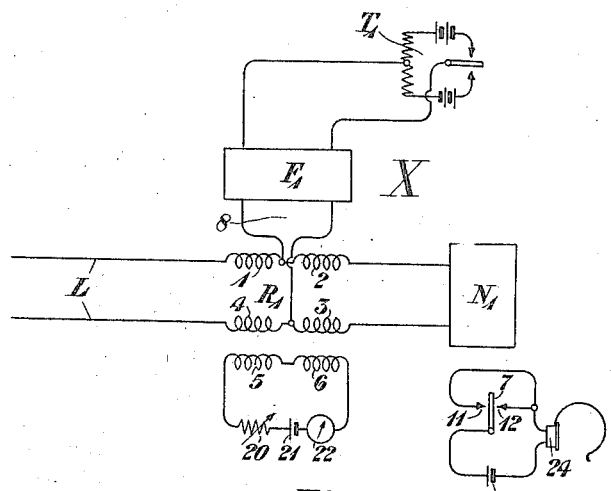
Figures 2A, 2B:
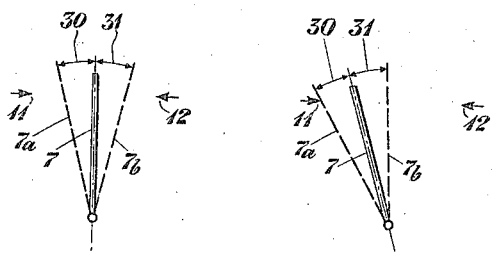

This invention will be better understood from the following description when read in connection with the attached drawing of which Fig. 1 shows one form of embodiment of the invention, and Figs. 2ª and 2ᵇ represent relative positions of the armature to illustrate the mode of operation of the invention.

In Fig. 1, L represents a metallic circuit extending from station X to a distant station, the terminal circuits at both stations being substantially that shown at station Y of Fig. 1 of the drawing of my copending application above referred to, with such modifications as will be pointed out hereafter. The terminal circuit at station X comprises an artificial line $N_1$ which is intended to balance the line L, so that the signaling currents impressed by the transmitting circuit 8 across the junction points of the windings of the relay $R_1$ for transmission over the line L to the terminal circuit at the distant end of the line will not effect the operation of the armature 7, and thereby produce any distortion of the signals received over the line L from the distant station, which are intended to operate the armature 7 of the relay $R_1$. The line L and the network $N_1$ are connected by means of the windings 1—2 and 3—4 of the relay $R_1$, which are so arranged upon the same magnetic core that when current flows over the line L from the distant station through the windings 1—2 and 3—4 and the network $N_1$ in series, the magnetization of the core will operate the armature 7 and produce signals thereby.

Bridged across the junction points of windings 1—2 and windings 3—4 respectively, is a transmitting circuit 8 having associated therewith a filter $F_1$ and a transmitting device $T_1$. The relay $R_1$ has also associated therewith two other windings 5—6 which are connected with what is termed the "vibratory circuit." The vibratory circuit shown in Fig. 1 is a modification of that shown at station Y to Fig. 1 of my copending application, Serial No. 485,309, filed July 16, 1921, the modification consisting in the removal of certain apparatus therein shown and connecting in series with the windings 5—6 an adjustable resistance 20, a source of direct current 21 and a milammeter 22. Furthermore the circuit of the armature 7 is disconnected from the vibratory circuit, and it is modified by substituting for the batteries of opposite polarity and the balanced resistances as shown in the said application, a single battery 23 and a receiver 24, the functions of which will be made clear later. As has been previously stated, there is connected with a line L at the distant station a terminal circuit similar to that shown at station Y in Fig. 1 of the drawing in my copending application above referred to excepting that the batteries shown in connection with the transmitting device $T_2$ have been removed from the transmitting circuit at the distant station, and resistances substituted therefor. The substitution of resistances for these batteries prevents the transmission of current from the distant station which would tend to interfere with the making of the tests to be described, and also maintains unchanged the line impedance.

Having in mind the foregoing description of the circuit arrangement shown in Fig. 1, the invention will now be clear from the following description of the mode of operation of the circuit.

The method by which this invention is carried out requires that relay $R_1$ be biased electrically by using the vibratory circuit windings 5—6 for the purpose of biasing. When current is not flowing through the windings of the relay $R_1$, the armature 7 will occupy a position midway between its contacts 11 and 12, as shown in Fig. $2^a$. If current reversals are impressed by the transmitting circuit 8 across the mid-points of the windings of the said relay, and if an unbalance exists between the line circuit and its artificial line $N_1$, the armature 7 will vibrate through an angular distance represented for example by the arcs 30 and 31, the limiting positions being represented by the dotted lines marked $7^a$ and $7^b$ respectively. The contact points 11 and 12 are so adjusted that the armature will not come in contact with either of the contact points throughout the range of vibration. It will be apparent that the angular distances represented by each of the said arcs are an indication of the magnitude of the unbalance between the artificial line $N_1$ and the real line L, and as the unbalance diminishes, the angular movement of the armature will also diminish. If, while the armature is vibrating freely in response to the impression of the current reversals across the winding of the relay, the current flowing from the source 21 through the windings 5—6 be increased by varying the adjustable resistance 20, the armature will be biased, for example, toward contact 11. The biasing current through the windings 5—6 should be increased until the armature 7 when vibrating freely just touches contact 11, as shown in Fig. $2^b$, which will be indicated by means of a receiver 24 connected with the battery 23 in the armature circuit. The magnitude of the current in the vibratory circuit at the instant the armature 7 touches the contact 11 will be indicated by means of the milammeter 22, and the reading should be noted. The current strength through the circuit of the windings 5—6 should then be increased until the armature 7 is held so firmly against contact 11 that the current reversals through the other windings of the relay fail to move it away from the said contact point. The magnitude of this current should then be noted, and the difference between this reading and the previous reading is an index of the magnitude of the unbalance between the artificial line and the rear line.

The artificial line $N_1$ is then adjusted so as to tend to balance more nearly the line circuit, and the testing operation as described above is repeated. By alternately measuring the magnitude of the unbalance and adjusting the artificial line, the magnitude of the unbalance may be reduced to substantially as small percentage as is obtainable by other well-known methods.

The armature 7 is preferably so designed that its resonant period is above the range of the testing frequency and consequently the magnitude of its swing is substantially proportional to the current through the windings controlling the armature. It is to be understood, however, that an armature may be so designed as to have its natural frequency within the range of frequency of the testing current, if it were desirable to do so.

In the foregoing description of the manner in which this invention is employed, the testing current has been described as a series of reversals created by the operation of the transmitter $T_1$. The result of the use of a reversing current is to cause the armature 7 to swing in both directions from its neutral position as shown in Fig. $2^a$. The use of a reversing current is not necessary since the desired result may be obtained by the use of a series of impulses of the same polarity which will cause the armature to swing in only one direction from its neutral position. However the manner of making the tests would be substantially the same when applying a series of impulses of the same polarity as would be followed with the use of a reversing current.

Although this invention has been described as applied specifically to the measurement of unbalance between an artificial line and a line circuit in a duplex telegraph system, it is not limited to this specific arrangement but may be used in making tests for unbalance between any two types of networks.

Although this invention has been disclosed as embodied in a certain form and arrangement of parts, it is to be understood that it is capable of embodiment in other and different forms and arrangements without departing from the spirit and scope of the invention as defined in the appended claims

What is claimed is:

1. The method of measuring unbalance between two electrical networks, which consists in impressing across the said network a steep sloped current impulse and determining the magnitude of the unbalance between the said networks by measuring the magnitude of the current necessary to nullify the effect of the unbalanced current upon an electroresponsive device.

2. The method of measuring unbalance between two electrical networks, which consists in impressing across the said networks a current impulse having a plurality of harmonics, and determining the magnitude of the unbalance between the said networks by measuring the magnitude of the current necessary to nullify the effect of the unbalanced current upon an electroresponsive device.

3. The method of measuring unbalance between two electrical networks, which consists in applying to the said networks a steep sloped current impulse allowing the resultant unbalanced current to actuate an electromagnetic device and impressing current from another source upon the said device until the effect of the said unbalanced current is nullified.

4. The method of measuring unbalance between two electrical networks, which consists in applying a steep sloped current impulse to the said networks, allowing the resultant current to actuate an electroresponsive device and nullifying the effect of the said current upon the said device by current from another source, and measuring the strength of the said nullifying current.

5. The method of measuring unbalance between two electrical networks, which consists in applying a steep sloped current impulse to the said networks allowing the resultant unbalanced current to actuate an electromagnetic device connected with the said networks, impressing upon the said device current from another source and varying the amount of the said current until the effect of the unbalanced current upon the said device is nullified.

6. The method of measuring unbalance between two electrical networks, which consists in applying a steep sloped current impulse to a plurality of networks related by an electromagnetic device, allowing the resultant current to flow through the windings of the said device so as to cause this armature to vibrate, applying current to a circuit also connected with the said electromagnetic device and varying the magnitude of the current of the said circuit so as to prevent the vibration of the said armature.

7. The method of measuring unbalance between two electrical networks, which consists in applying a steep sloped current impulse to a plurality of networks related by an electromagnetic device, allowing the resultant current to flow through the windings of the said device so as to cause the armature to vibrate, biasing the said armature until it reaches a predetermined fixed position and then increasing the degree of bias until the armature ceases to vibrate, and determining the difference between the biasing forces for the two positions.

8. In an electrical testing system, the combination with a source of telegraph signals of a plurality of networks, an electromagnetic device connected therewith, and a vibratory circuit connected with the said electromagnetic device, the said circuit having an adjustable source of current whereby the effect of the unbalanced current upon the said device may be nullified.

9. In an electrical testing system, the combination with a source of telegraph signals of a plurality of networks, an electromagnetic device having a plurality of windings connected with the said networks and having other windings connected with a vibratory circuit and a variable source of current connected with the said vibratory circuit to neutralize the magnetic effect produced by the resultant unbalanced current.

10. In a duplex telegraph signaling system, the combination with a line circuit, of an artificial line, a relay having upon its core a winding individual to and connected serially between each side of said line circuit and the corresponding side of the said artificial line, the said relay having upon the same core another winding connected in series with a variable source of current and means for measuring the same, all of the said windings being adapted to control an armature having in circuit therewith a source of current and an indicating instrument, and a transmitting circuit bridged across the mid-points of the line windings of the said relay current may be caused to flow in opposite directions through each half of each line winding thereby causing the said armature to vibrate through an angular distance, depending upon the magnitude of the unbalance between the line circuit and the artificial line.

11. In a duplex telegraph signaling system, the combination with a line circuit, of an artificial line to be adjusted to balance the said line circuit, a relay having certain windings connecting the said line circuit with the said artificial line and having another winding connected in series with a variable source of current and an indicating device, all of the said windings being adapted to control the action of the armature of the said relay, the said armature having means associated therewith to indicate whenever it touches either of its contact points, and a transmitting circuit bridged across the mid-points of the line windings of the said relay whereby a difference of potential may be applied across the said line circuit and the said artificial line in parallel.

12. In a duplex telegraph signaling system, the combination with a line circuit, of an artificial line to be adjusted to balance the said line circuit, balanced windings connecting the said line circuit with the said artificial line, a transmitting circuit bridged across the mid-points of the said windings adapted to apply a difference of potential across the said line circuit and the said artificial line in parallel, a biasing circuit containing another winding having associated therewith an adjustable source of current and means for indicating the magnitude of the biasing current, an armature adapted to vibrate in response to current reversals applied by the said transmitting circuit across the said first mentioned windings and adapted to be biased by the current through the winding of the said biasing circuit, and means associated with the said armature to indicate its movement relative to its contact points.

13. In a duplex telegraph signaling system comprising a line circuit, an artificial line to be adjusted to balance the said line circuit, a relay having line windings serially connecting the said line circuit and the said artificial line, a transmitting circuit bridged across the mid-points of the said line windings, a vibratory circuit comprising another winding of the said relay in series with a source of current and a meter, the said relay having an armature adapted to be vibrated by reversals of current through the said line windings and also adapted to be biased by the flow of current in the said vibratory windings, the method of determining the magnitude of the unbalance between the line circuit and its artificial line, which consists in impressing, by means of the transmitting circuit, a series of reversals across the mid-points of the line windings, allowing the resultant magnetizing current of the relay to cause its armature to vibrate freely without touching its contacts, simultaneously increasing the biasing current through the said vibratory circuit until the armature just touches one of its contacts and noting the magnitude of the current in the said vibratory circuit, further increasing the biasing current in the said vibratory circuit simultaneously with the application of the said reversals by the said transmitting circuit until the said armature ceases to vibrate and noting the magnitude of the current then flowing in the vibratory circuit, and computing the magnitude of the unbalance from the current readings noted.

In testimony whereof, I have signed my name to this specification this 15th day of July 1921.

HARRY NYQUIST.